US012619707B2

(12) United States Patent
Takeda et al.

(10) Patent No.: US 12,619,707 B2
(45) Date of Patent: May 5, 2026

(54) INFORMATION PROCESSING APPARATUS, METHOD FOR DISPLAYING PASSWORD STRENGTH, AND MEDIUM

(71) Applicant: CANON KABUSHIKI KAISHA, Tokyo (JP)

(72) Inventors: Kyohei Takeda, Tokyo (JP); Yasuhiro Hosoda, Kanagawa (JP); Yuki Narita, Chiba (JP); Mayumi Shibao, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 3 days.

(21) Appl. No.: 18/779,156

(22) Filed: Jul. 22, 2024

(65) Prior Publication Data

US 2025/0045375 A1 Feb. 6, 2025

(30) Foreign Application Priority Data

Aug. 2, 2023 (JP) ................................. 2023-126437

(51) Int. Cl.
*G06F 21/46* (2013.01)

(52) U.S. Cl.
CPC .................................... *G06F 21/46* (2013.01)

(58) Field of Classification Search
CPC .......... G06F 11/32; G06F 21/31; G06F 21/46; H04N 1/00408
See application file for complete search history.

(56) References Cited

U.S. PATENT DOCUMENTS

| 8,108,685 B2 | 1/2012 | Hurley |
| 2004/0250139 A1 | 12/2004 | Hurley |
| 2007/0006279 A1* | 1/2007 | Brown .................... G06F 21/31 |
| | | 726/1 |

(Continued)

FOREIGN PATENT DOCUMENTS

| JP | 2007148703 A | 6/2007 |
| JP | 2012238071 A | 12/2012 |
| JP | 2015090513 A | 5/2015 |

OTHER PUBLICATIONS

PerfMatters.Io, "How to disable Password Strength Meter in WordPress", retrieved Sep,. 22, 2025 , archived at https://web.archive.org/web/20211019211512/https://perfmatters.io/docs/disable-password-strength-meter/ (Oct. 19, 2021) (Year: 2021).*

(Continued)

*Primary Examiner* — Theodore C Parsons
(74) *Attorney, Agent, or Firm* — Venable LLP

(57) ABSTRACT

An information processing apparatus includes a user interface. The apparatus displays a software keyboard for inputting a password, using the user interface; in a case where a password strength meter indicating a strength of a password is set to be displayed using the user interface, calculates a strength of a password input from the software keyboard; and displays the software keyboard and the password strength meter indicating the strength of the input password, and in a case where a password strength meter indicating a strength of a password is set not to be displayed using the user interface, displays the software keyboard. In the case where a password strength meter indicating a strength of a password is set not to be displayed using the user interface, the password strength meter is not displayed.

11 Claims, 14 Drawing Sheets

(56)         References Cited

U.S. PATENT DOCUMENTS

| | | | |
|---|---|---|---|
| 2012/0032945 A1* | 2/2012 | Dare ....................... | G06F 9/451 345/418 |
| 2015/0193615 A1* | 7/2015 | Hosoda ................... | G06F 21/41 726/18 |
| 2015/0220715 A1* | 8/2015 | Kim .......................... | G06F 3/16 726/18 |
| 2018/0375891 A1* | 12/2018 | Juncker ................. | H04L 63/104 |
| 2021/0081524 A1* | 3/2021 | Moon ..................... | G06F 21/46 |

OTHER PUBLICATIONS

Japanese Office Action issued Aug. 2, 2024 in related Japanese Application No. 2023-126437.

* cited by examiner

102 PC

103 LAN

101

MFP

201 CPU

202 ROM

203 RAM

204 HDD

205 OPERATION PANEL

206 PRINTER

207 SCANNER

208 COMMUNICATION UNIT

209 IC CARD READER

210 USB INTERFACE

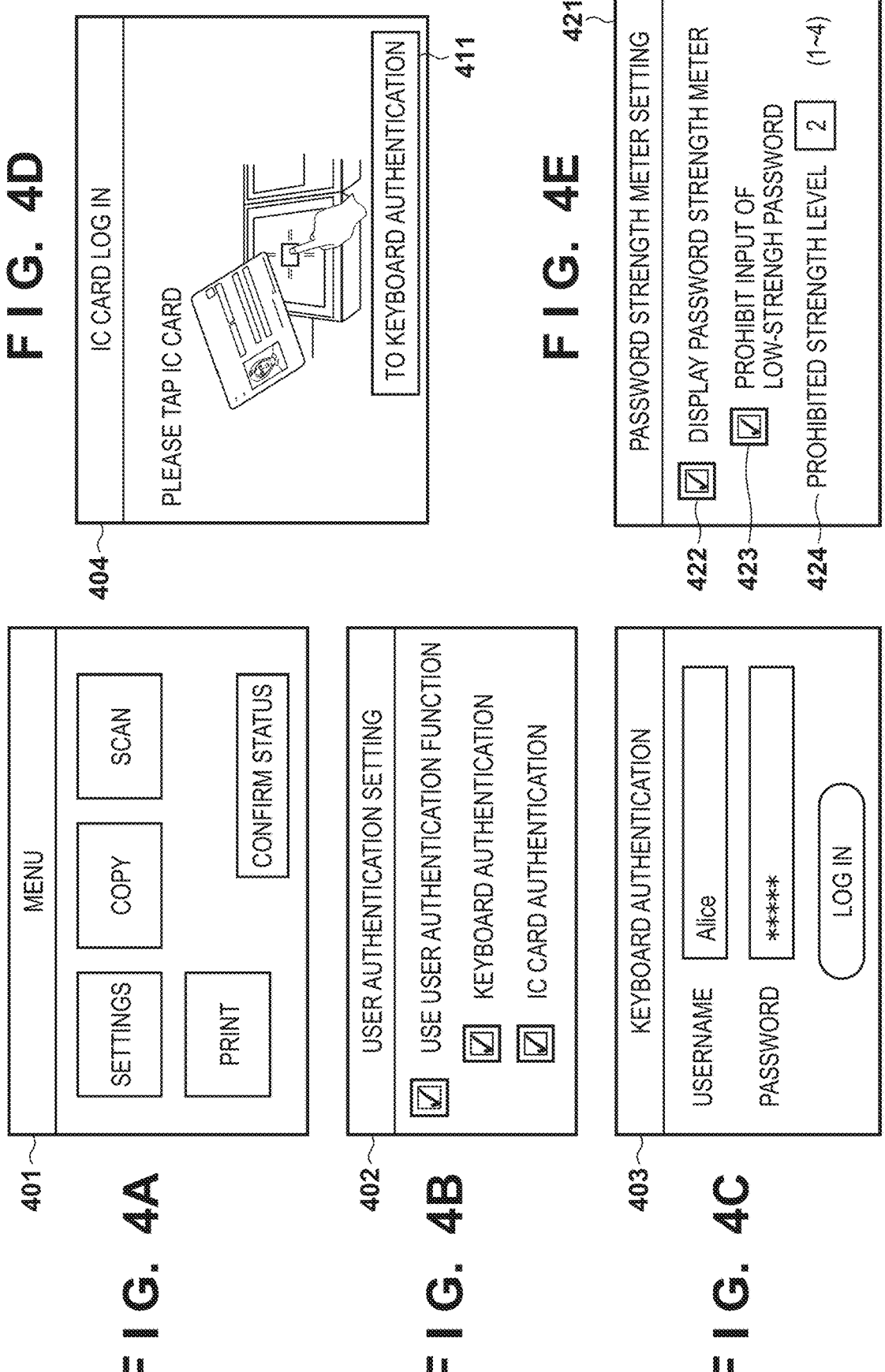

F I G. 4D

IC CARD LOG IN

PLEASE TAP IC CARD

TO KEYBOARD AUTHENTICATION — 411

404

F I G. 4E

PASSWORD STRENGTH METER SETTING — 421

☑ DISPLAY PASSWORD STRENGTH METER — 422

☑ PROHIBIT INPUT OF LOW-STRENGH PASSWORD — 423

PROHIBITED STRENGTH LEVEL [2] (1~4) — 424

F I G. 4A

MENU

| SETTINGS | COPY | SCAN |

PRINT

CONFIRM STATUS

401

F I G. 4B

USER AUTHENTICATION SETTING

☑ USE USER AUTHENTICATION FUNCTION

☑ KEYBOARD AUTHENTICATION

☑ IC CARD AUTHENTICATION

402

F I G. 4C

KEYBOARD AUTHENTICATION

USERNAME  Alice

PASSWORD  *****

( LOG IN )

Figure 5A:
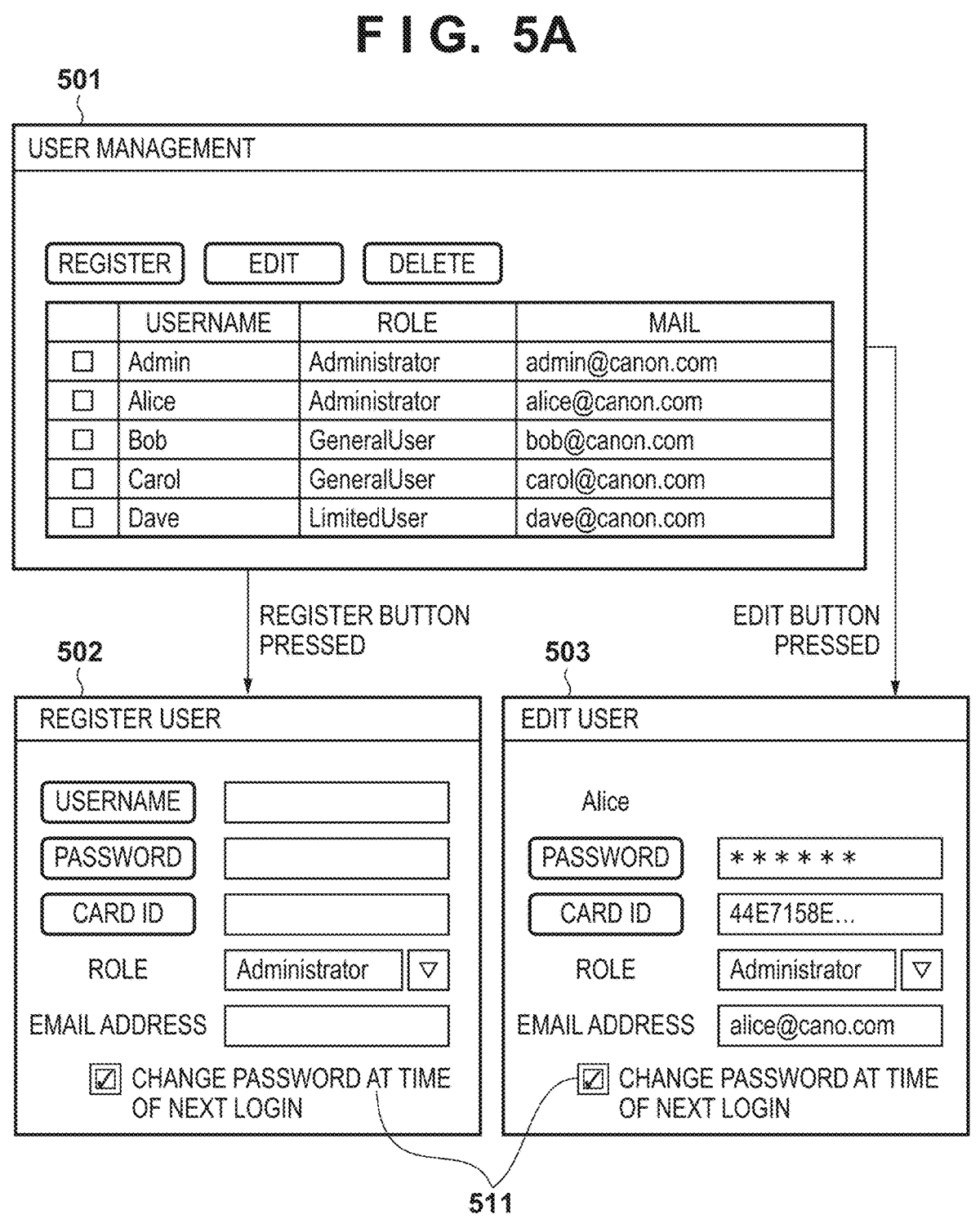

USER MANAGEMENT

[ REGISTER ]  [ EDIT ]  [ DELETE ]

|  | USERNAME | ROLE | MAIL |
|---|---|---|---|
| ☐ | Admin | Administrator | admin@canon.com |
| ☐ | Alice | Administrator | alice@canon.com |
| ☐ | Bob | GeneralUser | bob@canon.com |
| ☐ | Carol | GeneralUser | carol@canon.com |
| ☐ | Dave | LimitedUser | dave@canon.com |

REGISTER BUTTON PRESSED

EDIT BUTTON PRESSED

502

REGISTER USER

[ USERNAME ] [                    ]

[ PASSWORD ] [                    ]

[ CARD ID ] [                    ]

ROLE [ Administrator ▽ ]

EMAIL ADDRESS [                    ]

☑ CHANGE PASSWORD AT TIME OF NEXT LOGIN

503

EDIT USER

Alice

[ PASSWORD ] [ ＊＊＊＊＊＊ ]

[ CARD ID ] [ 44E7158E... ]

ROLE [ Administrator ▽ ]

EMAIL ADDRESS [ alice@cano.com ]

☑ CHANGE PASSWORD AT TIME OF NEXT LOGIN

511

F I G. 5B
F I G. 5C
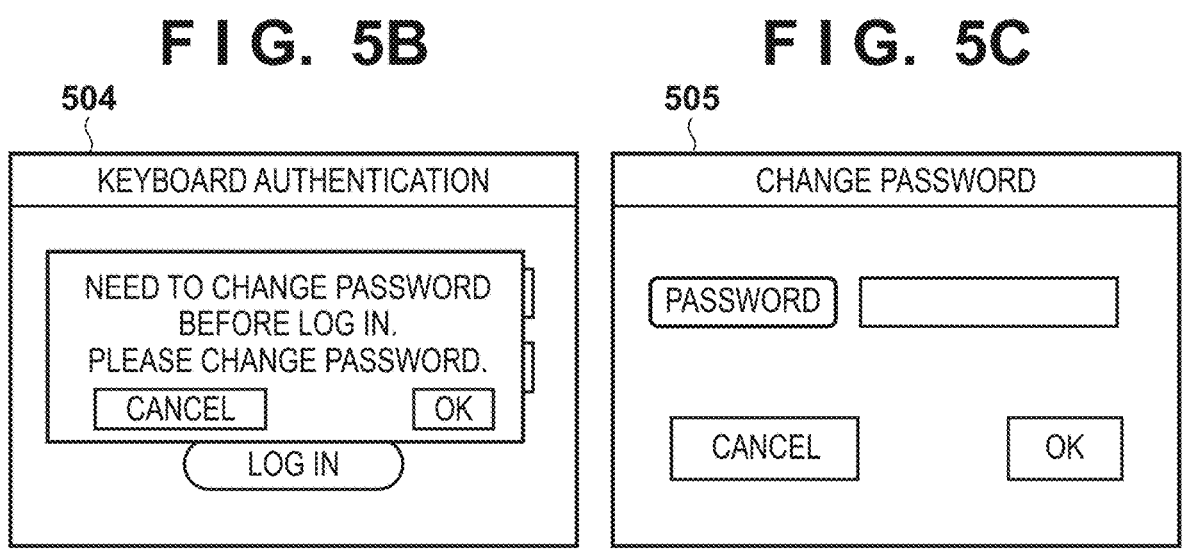
F I G. 6A
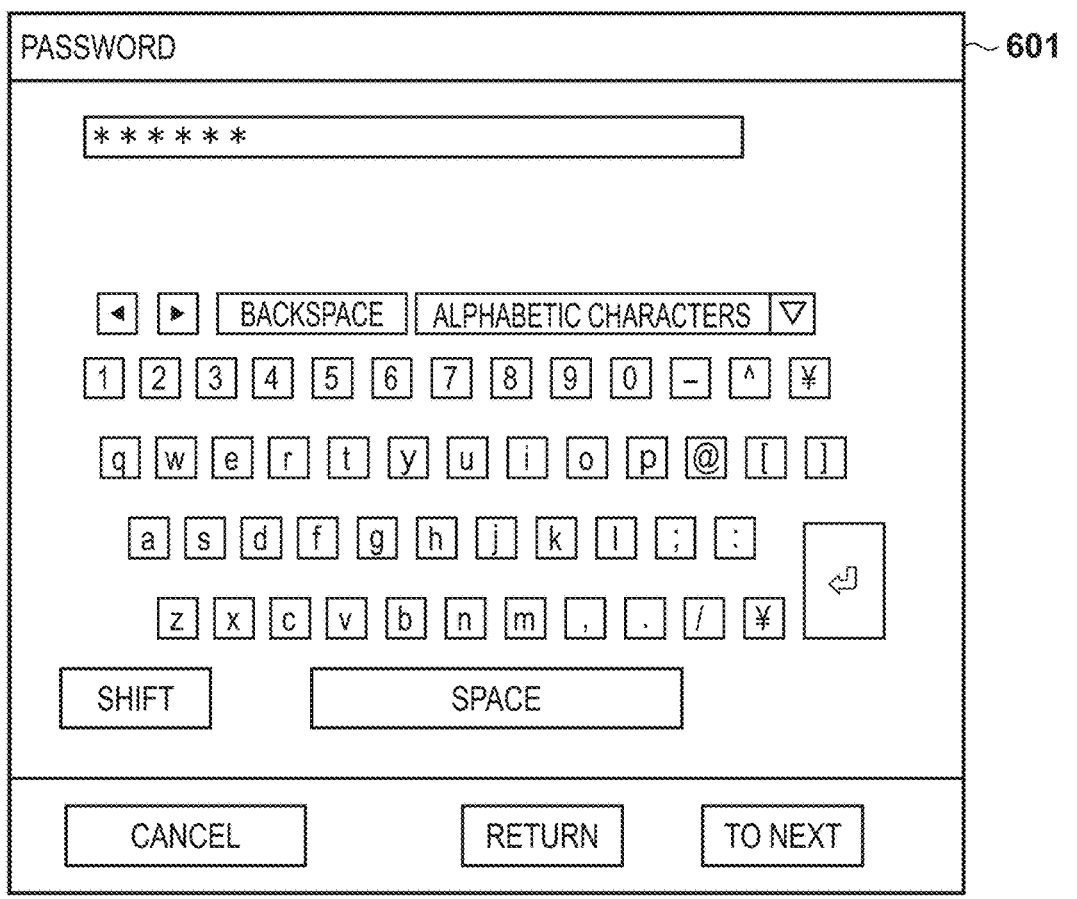

FIG. 6B

CONFIRM PASSWORD                                                    ~602

```
* * * * * *
```

◄  ►  | BACKSPACE | ALPHABETIC CHARACTERS | ▽

| 1 | 2 | 3 | 4 | 5 | 6 | 7 | 8 | 9 | 0 | – | ^ | ¥ |

| q | w | e | r | t | y | u | i | o | p | @ | [ | ] |

| a | s | d | f | g | h | j | k | l | ; | : |    ↵

| z | x | c | v | b | n | m | , | . | / | ¥ |

| SHIFT |            | SPACE |

| CANCEL |    | RETURN |    | OK |

F I G. 8
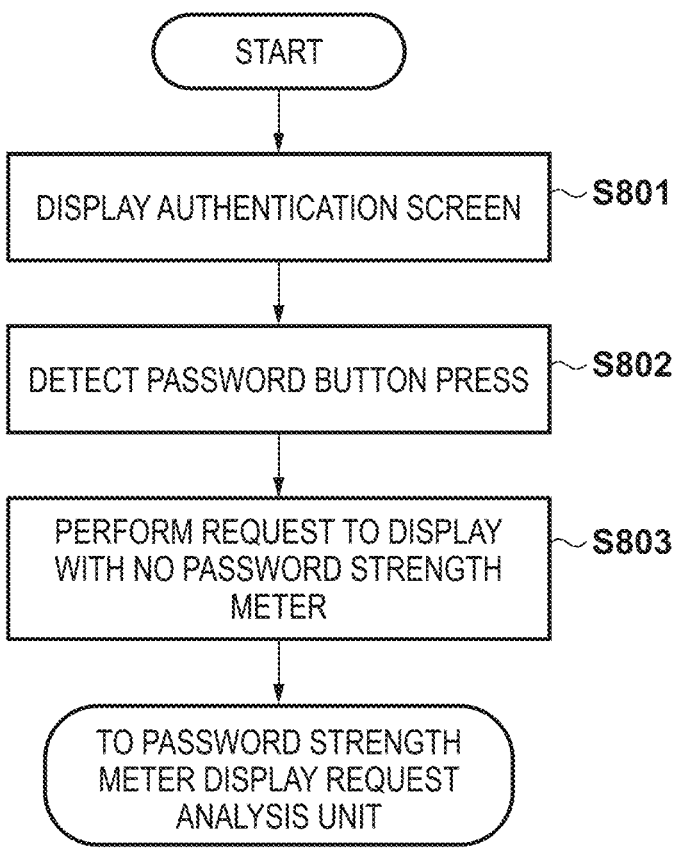

F I G. 10
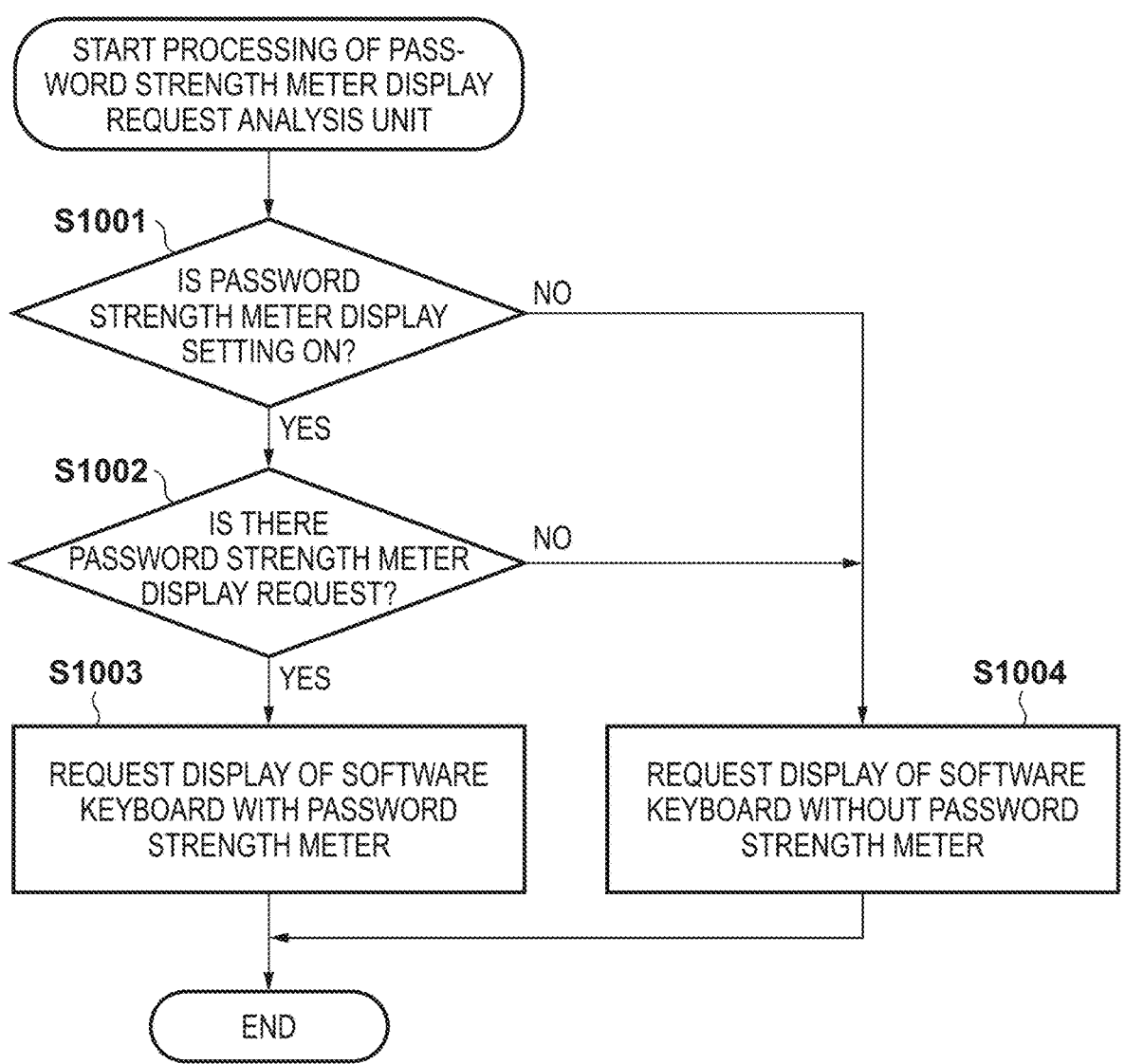

F I G. 11A
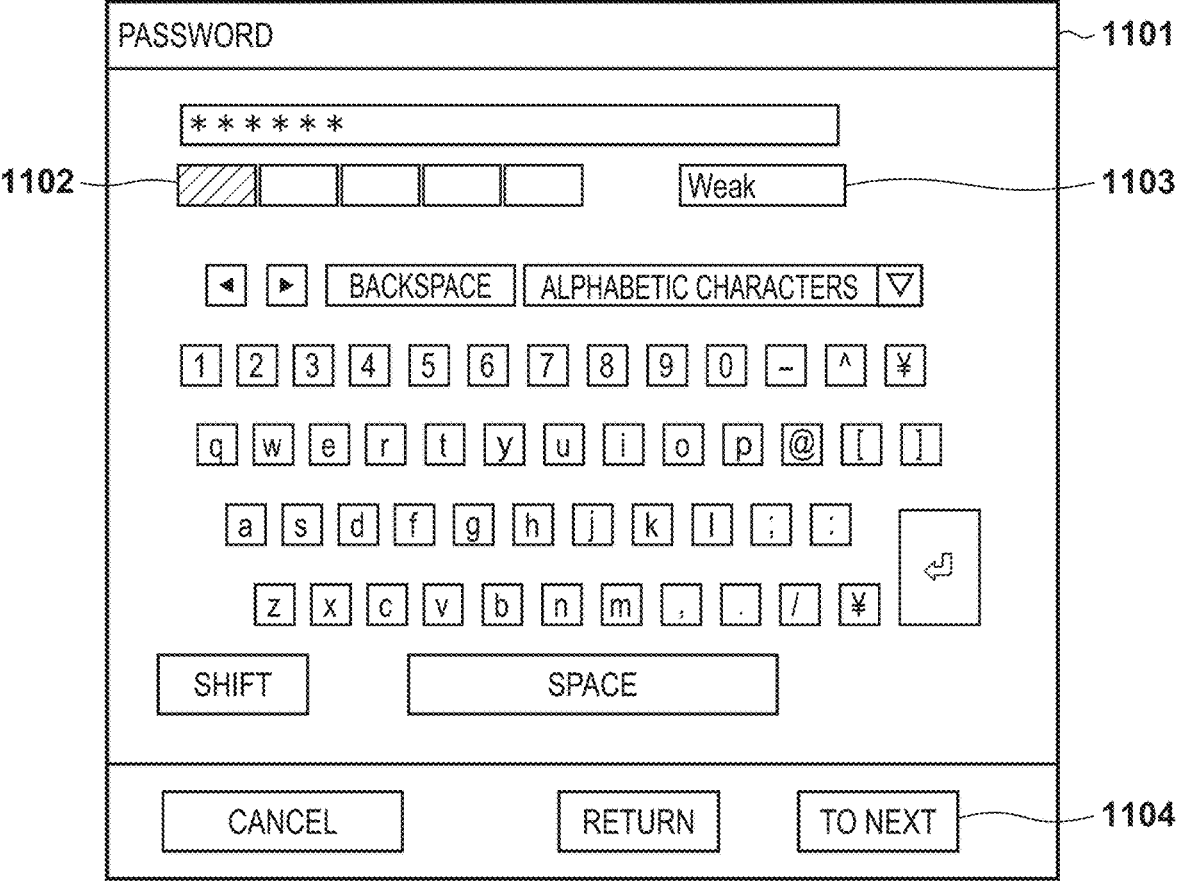

F I G. 11B
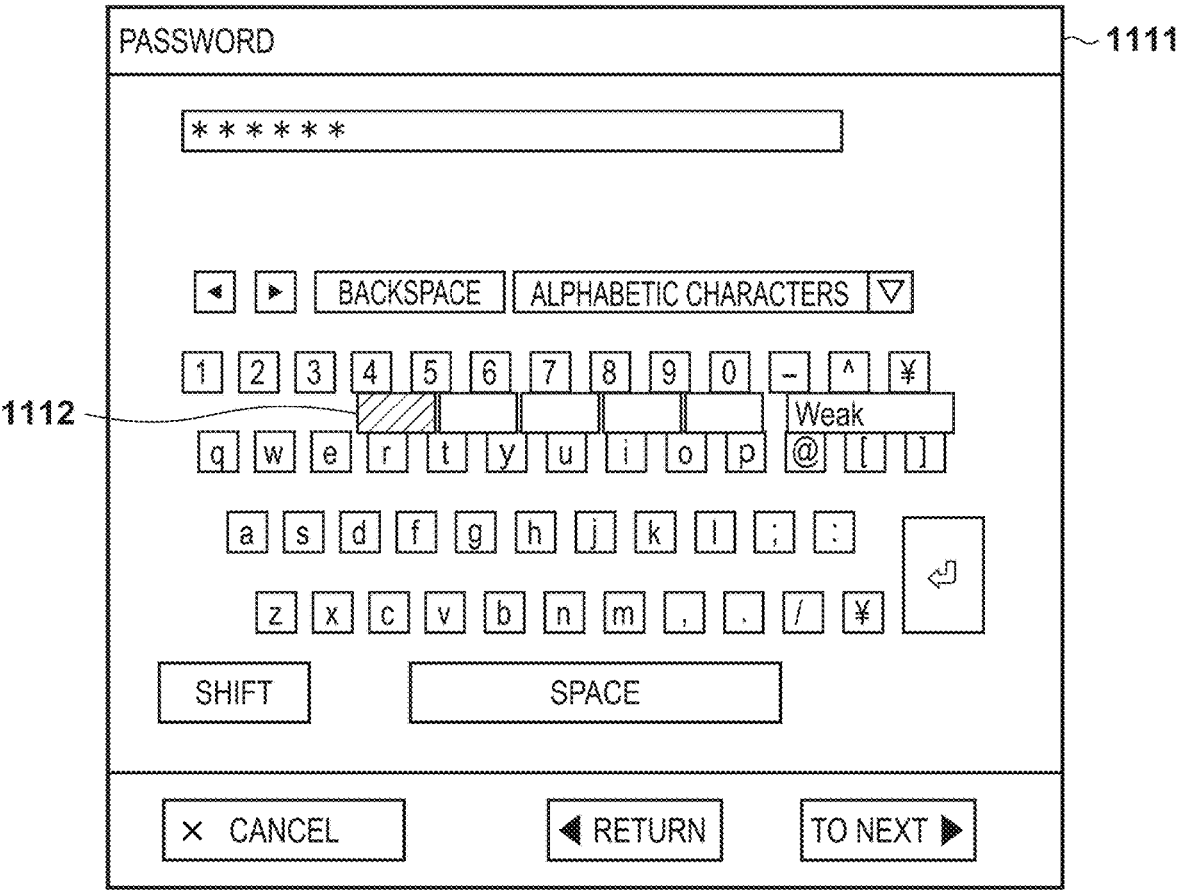

F I G. 12
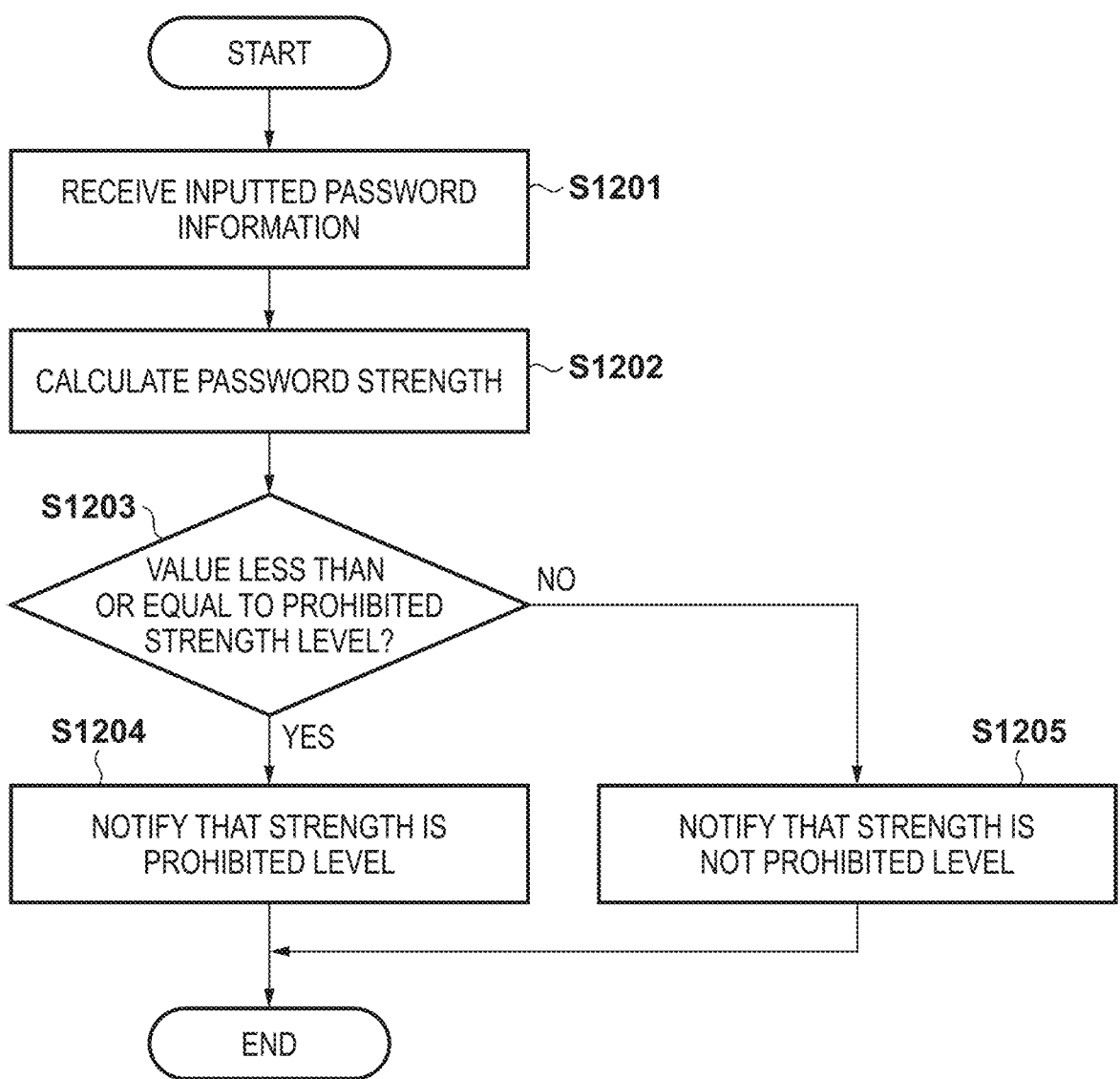

INFORMATION PROCESSING APPARATUS, METHOD FOR DISPLAYING PASSWORD STRENGTH, AND MEDIUM

BACKGROUND OF THE INVENTION

Field of the Invention

The present invention relates to an information processing apparatus including, for example, a function for displaying a password strength, a method for displaying a password strength, and a medium.

Description of the Related Art

Although passwords are authentication means that are most commonly used all over the world, setting a simple password often results in events in which information is easily stolen. One guideline for password security is NIST SP800-63-3 proposed by National Institute of Standards and Technology (NIST). This guideline includes a recommendation to provide a guidance such as a password strength meter when a user sets a password. One proposal to display a password strength is a technique disclosed in U.S. Pat. No. 8,108,685. U.S. Pat. No. 8,108,685 describes a technique for displaying the quality of a passphrase in a passphrase input screen.

When a password is input on a device such as an image forming apparatus and a mobile terminal, a software keyboard is displayed, and the password is input using the software keyboard. On a device having a limited display region, the software keyboard covers the screen of the device, leaving no space for displaying a meter indicating a password strength. Even when transition is made to a screen different from the software keyboard screen before displaying a password strength, it would be difficult to input a password and simultaneously confirm display of the strength of the password.

SUMMARY OF THE INVENTION

According to the present disclosure, a password strength meter is displayed while a password is being input, even in the case of inputting a password using a software keyboard on a device having a limited display region.

According to an aspect of the present invention, there is provided an information processing apparatus comprising: a user interface for display to a user and input by the user; at least one memory storing at least one program; and at least one processor, the at least one program being configured to cause the at least one processor to: display a software keyboard for inputting a password, using the user interface; in a case where a password strength meter indicating a strength of a password is set to be displayed using the user interface, calculate a strength of a password input from the software keyboard; and display the software keyboard and the password strength meter indicating the strength of the input password, and in a case where a password strength meter indicating a strength of a password is set not to be displayed using the user interface, display the software keyboard, wherein, in the case where a password strength meter indicating a strength of a password is set not to be displayed using the user interface, the password strength meter is not displayed.

According to the present invention, it is possible to display a password strength meter while a password is being input, even in the case of inputting a password using a software keyboard on a device having a limited display region.

Further features of the present invention will become apparent from the following description of exemplary embodiments with reference to the attached drawings.

BRIEF DESCRIPTION OF THE DRAWINGS

FIGS. 4A to 4E are diagrams showing setting screens in a local UI.

FIGS. 5A to 5C are diagrams showing a user management screen.

FIGS. 6A and 6B are diagrams showing a user interface of a software keyboard.

FIG. 8 is a flowchart illustrating an operation flow at the time of inputting a password from a login screen.

FIG. 10 is a flowchart illustrating a flow of a password strength meter display request analysis unit.

FIGS. 11A to 11C are diagrams showing user interfaces of software keyboards with a strength meter.

FIG. 12 is a flowchart illustrating an operation flow at the time of calculating a password strength.

DESCRIPTION OF THE EMBODIMENTS

Figure 1:
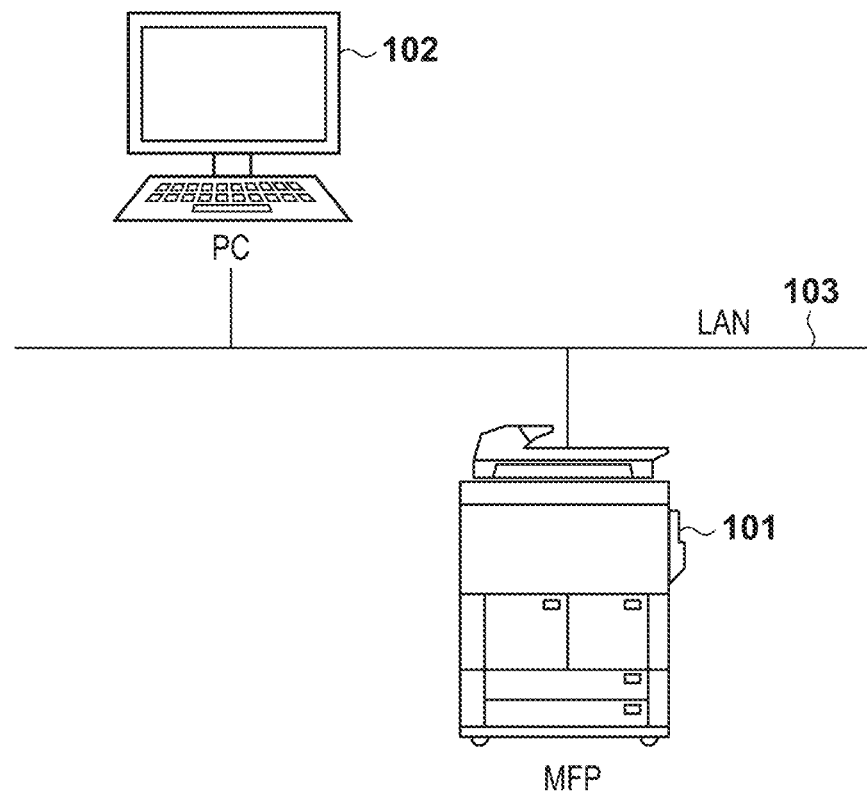
FIG. 1 is a diagram showing a network configuration.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

Embodiment 1

Figure 2:
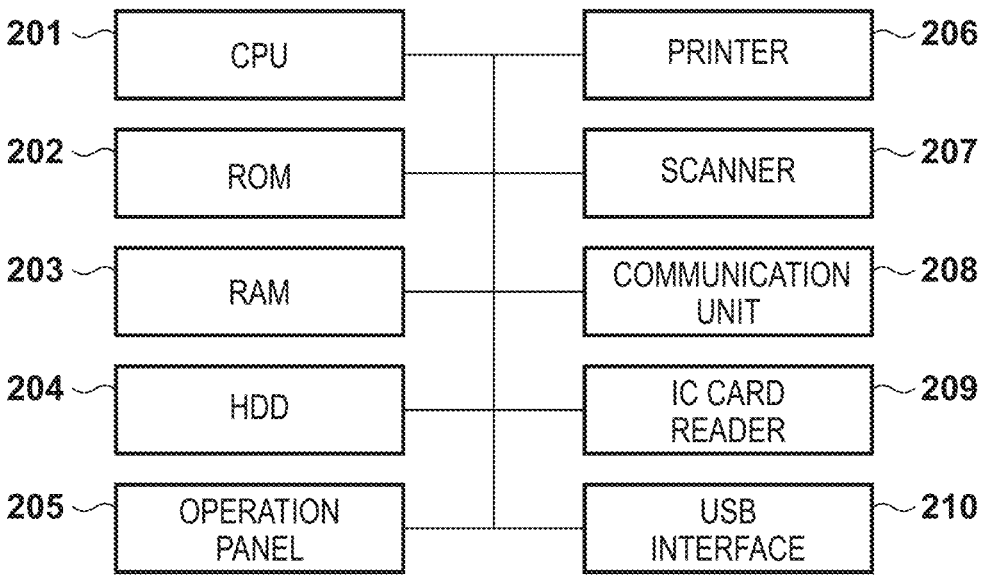
FIG. 2 is a diagram showing a hardware configuration of an MFP.

A multifunction peripheral (MFP), which has functions such as copying, printing, and scanning functions, installed in an office will be described as an example of an image forming apparatus that performs method for displaying a password strength according to the present embodiment.
System Configuration A network configuration in an office environment according to the present embodiment will be described with reference to FIG. 1. An MFP 101 communicates with a personal computer terminal (e.g., a PC 102) connected thereto via a network LAN 103. A user can access the MFP 101 from a web browser of the PC 102, and use a remote UI of the MFP 101. The MFP 101 can receive, from the terminal (e.g., the PC 102), a print job and a request to access a document saved in the MFP 101.
Hardware Configuration FIG. 2 is a simplified diagram showing a hardware configuration of the MFP 101. A CPU 201 is a central processing unit (processor) that controls the overall operation of the MFP 101. A random access memory (RAM) 203, which is a volatile memory, is a work area that is used as a temporary storage area for loading various control programs stored in a ROM 202 and an HDD 204.

The ROM 202, which is a non-volatile memory, stores a boot program and the like of the MFP 101. The HDD 204 is a nonvolatile hard disk having a larger capacity than the RAM 203. The HDD 204 stores a control program for the MFP 101. The HDD 204 also stores an operating system (OS) and an application program.

At the time of starting the MFP 101, the CPU 201 executes the boot program stored in the ROM 202. This boot program is used for reading out a program of the OS stored in the HDD 204 and loading the program onto the RAM 203. After executing the boot program, the CPU 201 subsequently executes the program of the OS loaded onto the RAM 203, and controls the MFP 101. The CPU 201 also stores, on the RAM 203, data used for the operation performed by the control program, and reads/writes the data.

Note that the MFP 101 is configured such that one CPU 201 executes various processes illustrated in a flowchart described below, but may be configured differently. For example, a plurality of CPUs or microprocessors (MPUs) may work cooperatively to execute the various processes illustrated in the flowchart. Also, some of the processes described below may be executed using a hardware circuit such as an application specific integrated circuit (ASIC) and a field-programmable gate array (FPGA).

An operation panel 205 is a touch-operable display. A printer 206 is a printer engine that prints print data received from an external device via a communication unit 208, and digital data obtained from a scanner 207. The scanner 207 is a scanner device that reads out paper original and digitizes the original.

The communication unit 208 is a network interface for connecting to the Internet and a local area network (LAN) of the office. An IC card reader 209, which is a device for reading out information used for user authentication from an IC card, is a unit necessary for realizing IC card authentication. A USB interface 210 is an interface to which a device that supports a USB standard can be attached.

Since the MFP 101 performs information processing by executing a program using the processor (CPU) in the above-described manner, the MFP 101 may also be called an information processing apparatus.

Software Configuration

Figure 3:
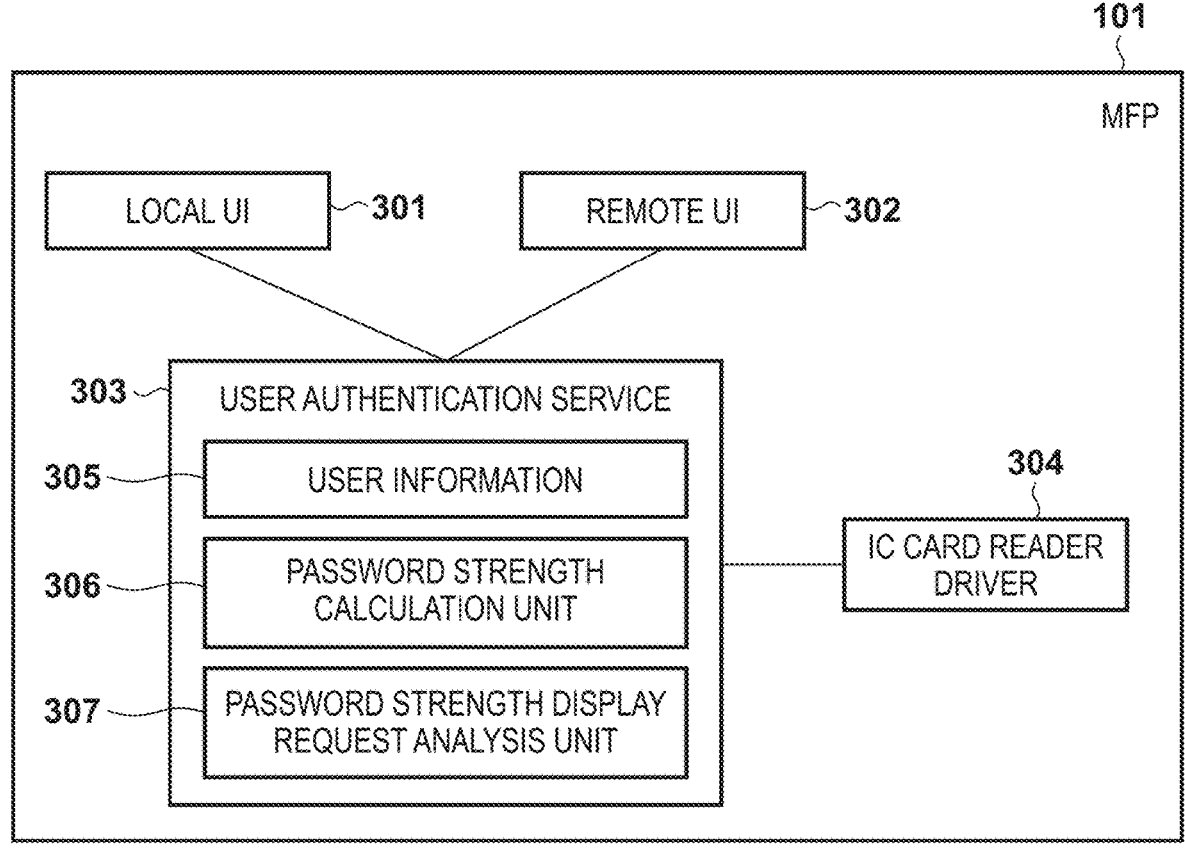
FIG. 3 is a diagram showing a software configuration.

FIG. 3 is a simplified diagram showing a software configuration of the MFP 101. A local UI 301 of the MFP 101 provides a user interface for a user locally accessing the local UI 301 to change the settings of the MFP 101 and use the functions thereof, using display of the operation panel 205.

A remote UI 302 has a hypertext transfer protocol (HTTP) server function. Also, the remote UI 302 provides a user interface composed in Hypertext Markup Language (HTML) to a user remotely accessing the remote UI 302. The user can use a web browser of the PC 102 to access the remote UI 302, and change the settings of the MFP 101 and use the functions thereof. The web browser of the PC terminal displays the user interface composed in HTML. The user changes the settings and uses the functions by operating the user interface displayed in this web browser.

A user authentication service 303 is a software module that authenticates users who use the local UI 301 and the remote UI 302. The user authentication service 303 authenticates a user who uses the local UI 301, using a username, a password, and an IC card that are input from a keyboard (including a software keyboard). Also, the user authentication service 303 authenticates a user who uses the remote UI 302, using a username, a password, and a one-time password. An IC card reader driver 304, which is a driver that controls the IC card reader 209, obtains information from the IC card and provides IC card information to the user authentication service 303.

The user authentication service 303 holds and manages user information 305, and has the functions of a password strength calculation unit 306 that calculates the strength of the input password, and a password strength display request analysis unit 307. The password strength display request analysis unit 307 has the function for determining whether to call a software keyboard with a password strength meter or a software keyboard without a password strength meter when a password is input using the local UI 301.

Password Strength

A password strength is a level of security (unguessability) quantified, taking into account the length, the complexity, and so forth of a password to be set. In general, rules are often provided for a password, including, for example, using a combination of a plurality of character types (a number, a symbol, an uppercase character, and a lowercase character), and setting a certain character length (eight characters or more). Then, the password strength is calculated based on the types, the length, and the like of the characters used. Other calculation methods include a method in which character strings and the like that are likely to be guessed from frequently used keywords, typical personal names, English words, and a keyboard layout (qwerty) are held as a dictionary file in advance, and a password matching any of these character strings at the time of inputting a password is determined to have a low level of security.

In the present embodiment, the password strength calculation unit 306 quantifies a password strength using any of the above-described methods. As a calculation result of a password strength, one of five levels of integer values of 1 to 5 is returned. A password strength meter is a visible representation of the above-described password strength on a screen.

User Information

The user information 305 managed by the user authentication service 303 will be described. The user authentication service 303 manages the user information 305 by storing the user information 305 in a user information table as shown in Table 1. The user information table is a database recorded in the HDD 204. Note that a database of another node on the network may be used after encrypting a communication path and a storage, or preventing alteration thereof. A card ID, a password, a user role, an email address, and so forth that are used for IC card authentication are recorded for each user in the user information table.

TABLE 1

| Username | Password | Card ID | Role | Mail |
|---|---|---|---|---|
| Admin | ******** | F1EABB15 | Administrator | admin@gano.com |
| Alice | ******** | 44E7158E | Administrator | alice@gano.com |
| Bob | ******** | 045BB438 | GeneralUser | bob@gano.com |
| Carol | ******** | 19E313B6 | GeneralUser | carol@gano.com |
| Dave | ******** | BDFDB35 | LimitedUser | dave@gano.com |

A role is information indicating the use authority of a user for the MFP 101. Examples of the use authorities and the roles are shown in the role information table (Table 2) below. In addition to the role definitions provided in the MFP 101 at the time of shipment from the factory, each user may be allowed to set the details of use authority and create a new role. Note that "Setting change" in Table 2 refers to the change of any of the values set for the MFP 101, including, for example, a user authentication setting and user management, which will be described later. Various settings of the MFP 101, such as a network setting and a print function setting, may also be changed. "Administrator" is a role assigned to an administrator user, and "GeneralUser" and/or "LimitedUser" is a role assigned to a general user.

TABLE 2

| Role | Authority |
|---|---|
| Administrator | Setting change (possible), color printing (possible), address book editing (possible) |
| GeneralUser | Setting change (not possible), color printing (possible), address book editing (possible) |
| LimitedUser | Setting change (not possible), color printing (prohibited), address book editing (prohibited) |

User Authentication Setting

Next, the user authentication setting included in the MFP 101 will be described, taking the user interface (UI) shown in FIGS. 4A to 4E as an example. Upon starting the MFP 101, the local UI 301 displays a menu screen 401 (FIG. 4A) for selecting an application.

An administrator user can display a user authentication setting screen 402 (FIG. 4B) via the menu screen 401. In the user authentication setting screen 402, enabling/disabling of a user authentication function can be selected. If the enabling of the user authentication function is selected, one or both of login functions, namely, keyboard authentication and IC card authentication, can be further selected. The user authentication setting screen 402 shows a state in which all of the login functions are selected after the user authentication function has been enabled. The setting selected by the user is stored in the HDD 204, and the user authentication service 303 refers to the setting and starts the login function corresponding to the user setting. A user authentication function that can be selected from the user authentication setting screen 402 may also be referred to as a login function.

If both login functions (keyboard authentication and IC card authentication) are enabled, the local UI 301 displays an IC card authentication screen 404 (FIG. 4 D) for user authentication. Note that the keyboard authentication can also be performed by selecting a button 411 to transition to a keyboard authentication screen 403.

The keyboard authentication screen 403 (FIG. 4C) is displayed if the keyboard authentication alone is enabled, and the IC card authentication screen 404 is displayed if the IC card authentication alone is enabled, or the IC card authentication and the keyboard authentication are enabled. If the IC card authentication alone is enabled, the button 411 for transitioning from the IC card authentication screen 404 to the keyboard authentication screen 403 is not displayed.

When the user authentication service 303 reads the information (card ID) recorded in the IC card, the user authentication service 303 refers to the account information stored in the HDD 204, and causes the user with the matching card ID to log in to the MFP 101.

The user authentication service 303 checks the username and the password input into the keyboard authentication screen 403 against the account information stored in the HDD 204, and causes the matching user to log in to the MFP 101.

The user authentication service 303 stores, in an object called a login context, the information of the logged-in user, and transmits the information to another software module. Examples of the information stored in the login context are shown in Table 3 below. As shown in table 3, the username, the role, the email address, and so forth of the logged-in user are stored in the login context.

TABLE 3

| Item | Value |
|---|---|
| Login username | Alice |
| Role | Administrator |
| Mail | Alice@gano.com |

If the login to the MFP 101 has succeeded, the local UI 301 closes the login screen such as the keyboard authentication screen 403, and causes the screen to transition to the menu screen 401. The menu screen 401 identifies the logged-in user by referring to the above-described login context, and thereafter provides a menu screen suitable for the user according to the role of the logged-in user. The menu screen and the screens for various functions (copying and scanning) provide functions that can be personalized according to the user preference.

If a password strength meter setting is selected from setting items via the setting menu screen 401, a password strength meter setting screen 421 (FIG. 4E) is displayed.

A password strength meter display setting 422 is a setting to indicate whether or not to display a password strength meter, or in other words, a setting indicating whether the password strength meter is to be displayed or not to be displayed. If the setting is ON, the password strength meter is displayed on a software keyboard at the time of inputting a password. If the setting is OFF, the password strength meter is not displayed.

A setting 423 to prohibit input of a low-strength password and a prohibited strength level setting 424 are setting to calculate the strength of the input password using the password strength calculation unit 306, and prohibiting input of the password if the calculated result is less than or equal to the value set in the strength level setting 424. That is, a user can set a reference value using the strength level setting 424, and prohibit a password with a value less than or equal to the reference value from being received, using the setting 423. Calculation results of strength are handled as five levels of integer values of 1 to 5. For example, a password with a strength value of 1 is prohibited when the strength level is set to 1, and passwords with a strength value of 1 or 2 are prohibited when the strength level is set to 2. Being prohibited means that the corresponding password is not allowed be set. Accordingly, the calculation of password strength and the limiting of a low-strength password are performed at the time of setting or changing a password.

User Management

FIGS. 5A to 5C are examples of an UI, provided by the local UI 301, for managing user accounts of the MFP 101. Not only the local UI 301, but also the remote UI 302 may provide a similar UI for the administrator.

A user management screen 501 shown in FIG. 5A is a screen for managing a list of user accounts. Only an administrator having the role "Administrator" can access this screen. The user management screen 501 provides the function for registering a new user account, selecting a registered account, and editing or deleting the registered account. For example, in the case of registering a user, the user "Admin" presses a register button on the user management screen 501. In response to this, the local UI 301 displays a user registration screen 502. With the user registration screen 502, a username, a password, a card ID, an email address, a role, and so forth can be registered and saved.

In the case of editing a user, the user "Admin" selects the account of an existing user, for example, "Alice", and presses an edit button. In response to this, the local UI 301 displays a user editing screen 503. With the user editing screen 503, a password, a card ID, an email address, a role, and so forth can be edited and saved. In the case of deleting a user, the administrator user presses a delete button after selecting a user to be deleted. Thus, the user information of the selected user is deleted.

The user registration screen 502 and the user editing screen 503 have a setting 511 to change the password at the time of the next login. If this setting is ON, the user is asked to set a new password at the time of logging in. At that time, when the user logs in, a screen 504 is displayed (FIG. 5B), and the procedure for changing the password is first started. When the user attempts to newly set a password on the user registration screen 502 and the user editing screen 503, a password changing screen 505 is displayed (FIG. 5C). The password input in the password changing screen 505 is set as a new password in the user information. Note that any user for which a password is set can change the password even if the user does not have the authority of the administrator. In that case, for example, when the user selects the setting while being logged in, the user editing screen 503 in which only the user information of the login user is displayed may be displayed in place of the user management screen 501. On such a screen as well, only items that are to be set by the user, such as a password and an identification number, may be editable, and the other items may not be displayed, or may be displayed but non-editable.

Display of Password Strength Meter

In a system that is not provided with a keyboard as standard equipment as in the case of the MFP 101 of the present embodiment, a password input screen 601 with a software keyboard, shown in FIG. 6A, is displayed in order to input a password on the user registration screen 502 and the user editing screen 503, for example. The operation panel 205 of the MFP 101 has a screen size significantly smaller than that of a personal computer of the like. Accordingly, if a software keyboard is displayed, the software keyboard will occupy a significant space of the screen, thus making it difficult to display a password strength.

Cases are also possible where a keyboard is mounted on the MFP 101, and where a password is input with a USB keyboard using the USB interface 210. However, registration and changing of a password are performed in a state in which another screen such as the user registration screen 502 and the user editing screen 503 is displayed. Accordingly, the display region is limited, and it is indeed difficult to display the password strength in response to the input.

The present embodiment solves the above-described problems by displaying a password strength meter on the password input screen 601 with a software keyboard. The password strength meter is not necessarily displayed at the time of inputting a password, but is displayed only when a password is newly input, or changed. The password strength meter is not displayed at the time of inputting a password for checking an already registered password. These processes are switched depending on whether or not to perform a password strength display request at the time of calling a software keyboard, and the determination for the request is made by the password strength display request analysis unit 307. Based on the request, the password strength display request analysis unit 307 switches between calling a software keyboard with a password strength meter and calling a software keyboard without a password strength meter.

After inputting a password on the password input screen 601 with a software keyboard and then pressing a next button, a password confirmation screen 602 with a software keyboard, shown in FIG. 6B, is displayed in order to confirm the input value. In the present embodiment, the password strength meter is not displayed on the password confirmation screen 602. However, it is also possible to adopt a configuration in which the password strength meter is also displayed at the time of confirmation. The password input screen 601 with a software keyboard and the password confirmation screen 602 without a software keyboard are collectively referred to as a software keyboard or a software keyboard screen.

Operation Flow Relating to Display of Password Strength Meter

The following describes the process executed by the user authentication service 303 to call a software keyboard according to a determination result of the password strength display request analysis unit 307. In the present embodiment, the procedure illustrated in the following flow is recorded in software programs (also may be simply referred to as programs) of the local UI 301 and the user authentication service 303. The software programs are stored in nonvolatile storages such as the ROM 202 and the HDD 204, and are loaded onto the RAM 203, and the CPU 201 executes the flow illustrated in the flowchart. The pieces of software such as the local UI 301 and the user authentication service 303 provide APIs to each other, and operate in coordination with each other by mutually using the APIs. The description of calling of APIs has been omitted from the description of the operation flow. In the description of the drawings, each of the software modules, shown in FIG. 3, implemented by the CPU 201 executing a program serves as a main entity in terms of software. However, as described above, the CPU 201 serves as a main entity in terms of hardware.

At the Time of Registration or Changing of Password

Figure 7:
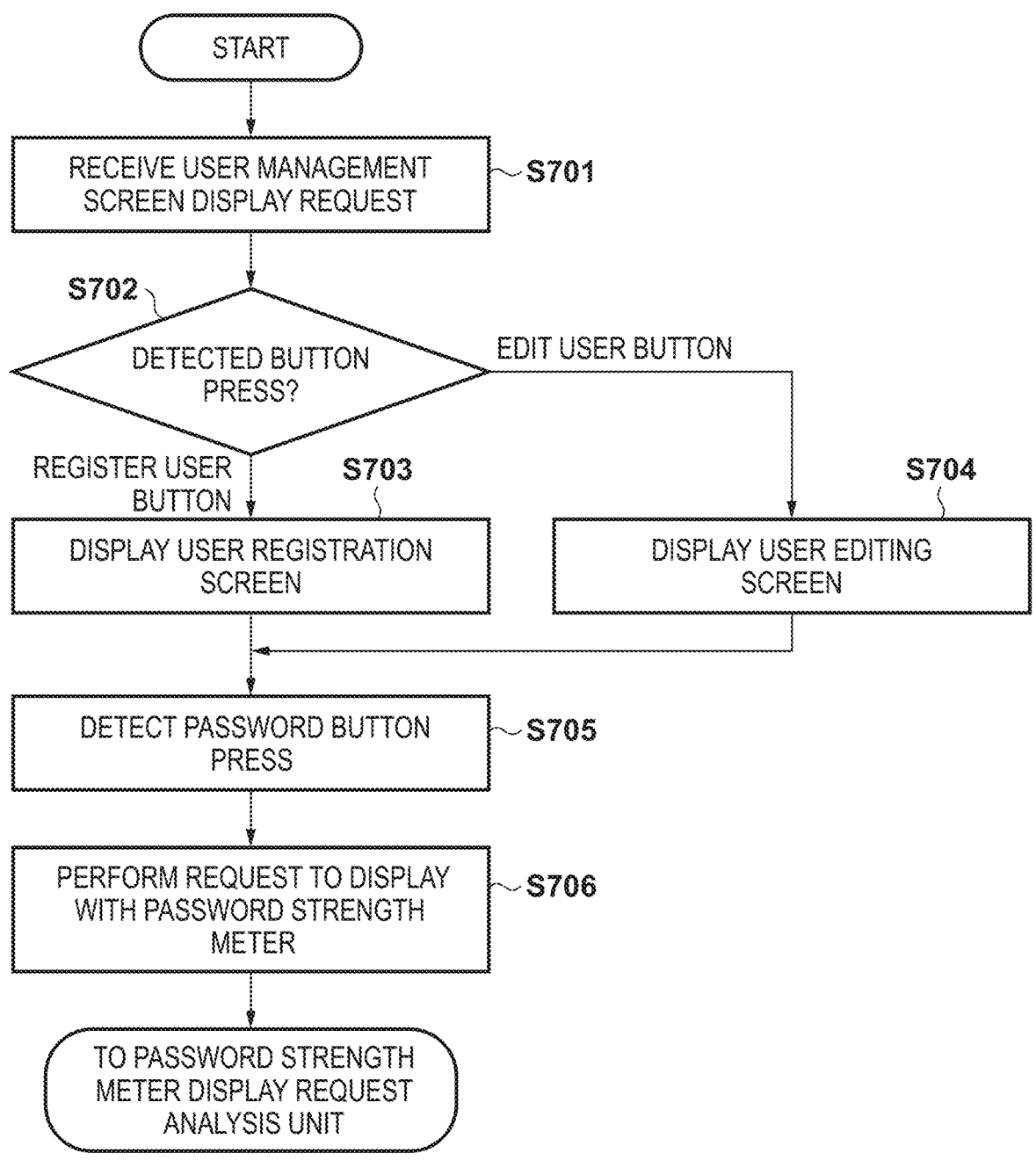
FIG. 7 is a flowchart illustrating an operation flow at the time of inputting a password from the user management screen.

FIG. 7 is a flowchart illustrating an operation flow when a password button is pressed from the user management screen 501, or via the registration screen 502 or the user editing screen 503.

Upon receiving a request to display a user management screen from the menu screen 401, the user authentication service 303 displays the user management screen 501 (S701). When the user presses a button on the user management screen 501, the user authentication service 303 detects the pressing of a button, and determines which button has been pressed (S702). Here, the delete button is not taking into account. If it is detected that the register button has been pressed, the user authentication service 303 displays the user registration screen 502 (S703). If it is detected that the edit button has been pressed, the user authentication service 303 displays the user editing screen 503 (S704). When the user presses the password button on the user registration screen 502 or the user editing screen 503, the user authentication service 303 detects the pressing of the password button (S705). In response to that detection, a request to display a software keyboard with a password strength meter is transmitted to the password strength display request analysis unit 307 (S706).

FIG. 10 is a flowchart illustrating an operation flow of the password strength display request analysis unit 307, which is a function of the user authentication service 303, after receiving a request to display a software keyboard.

The password strength display request analysis unit 307 determines whether the password strength meter display setting 422 is enabled (ON) (S1001). If it is determined that the password strength meter display setting is enabled, the password strength display request analysis unit 307 determines if there is a request to display a password strength meter (S1002). A request to display a password strength meter is a request that is transmitted by the user authentication service 303 at the time of detecting the pressing of the password button. In S706 described above, a request to display a password strength meter is performed. If there is a request to display a password strength meter, the password strength display request analysis unit 307 transmits a request to display a software keyboard with a password strength meter to the local UI 301 (S1003). If there is no display request in S1002, or if the display setting is not enabled (OFF) in S1001, the password strength display request analysis unit 307 transmits a request to display a software keyboard without a password strength meter to the local UI 301 (S1004).

Figure 11C:
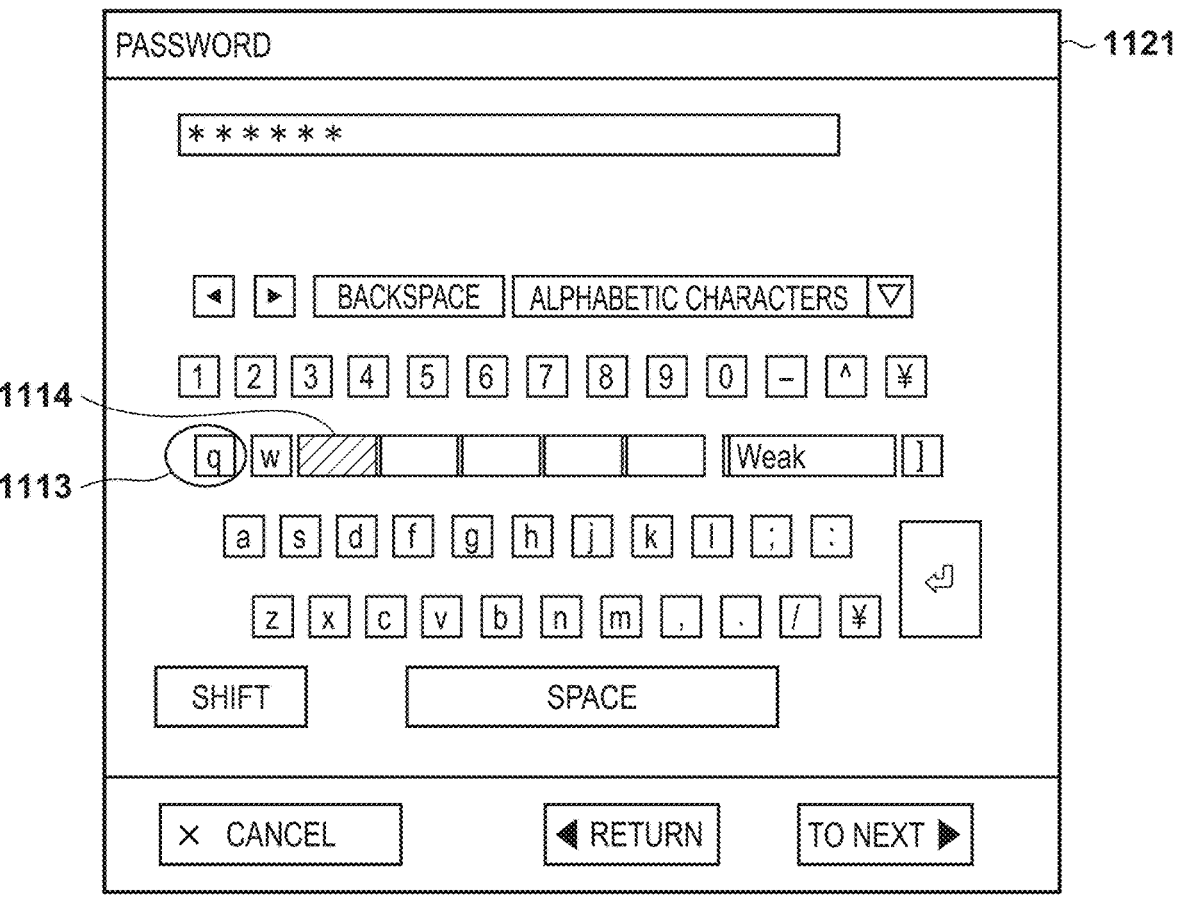

If a request to display a software keyboard with a password strength meter is received, the local UI 301 displays a software keyboard with a password strength meter. If a request to display a software keyboard without a password strength meter is received, the local UI 301 displays a software keyboard without a password strength meter. The software keyboard with a password strength meter may be a screen provided, for example, by adding a password strength meter to the password input screen 601. Examples thereof are shown in FIGS. 11A to 11C. The software keyboard without a password strength meter may be the password input screen 601 itself.

When a password is input and the "next" button is touched on the password input screen 601 shown in FIG. 6A, a password confirmation screen is displayed, and the user is asked to input the same password again. At this time, in the present embodiment, the software keyboard without a password strength meter may be displayed. The password confirmation screen 602 shown in FIG. 6B is indeed an example of such a software keyboard. That is, in response to the "next" button being touched, the user authentication service 303 may perform a request to display the software keyboard without a password strength meter to the password strength display request analysis unit 307. Then, in response to the "OK" button being touched on the password confirmation screen 602, the password input on the password input screen 601 with a password strength meter and the password input on the password confirmation screen 602 are compared. If the passwords match, the password is registered in the user information as a new password of the login user.

At the Time of Password Authentication

FIG. 8 is a flowchart illustrating an operation flow when the password button has been pressed from the keyboard authentication screen 403.

The user authentication service 303 displays the keyboard authentication screen 403 (S801), and detects the pressing of the password button on the keyboard authentication screen 403 (S802). Upon the detection, the user authentication service 303 transmits a request to display the software keyboard without a password strength meter to the password strength display request analysis unit 307 (S803). As described above, on the login screen, since a password is input only to be checked against the registered password, there is no need to display a strength for the password. Accordingly, here, a request for display without a password strength meter is transmitted.

The processes S1001 to S1004 executed by the password strength display request analysis unit 307 are the same as those described above, and therefore the description thereof has been omitted.

Figure 9:
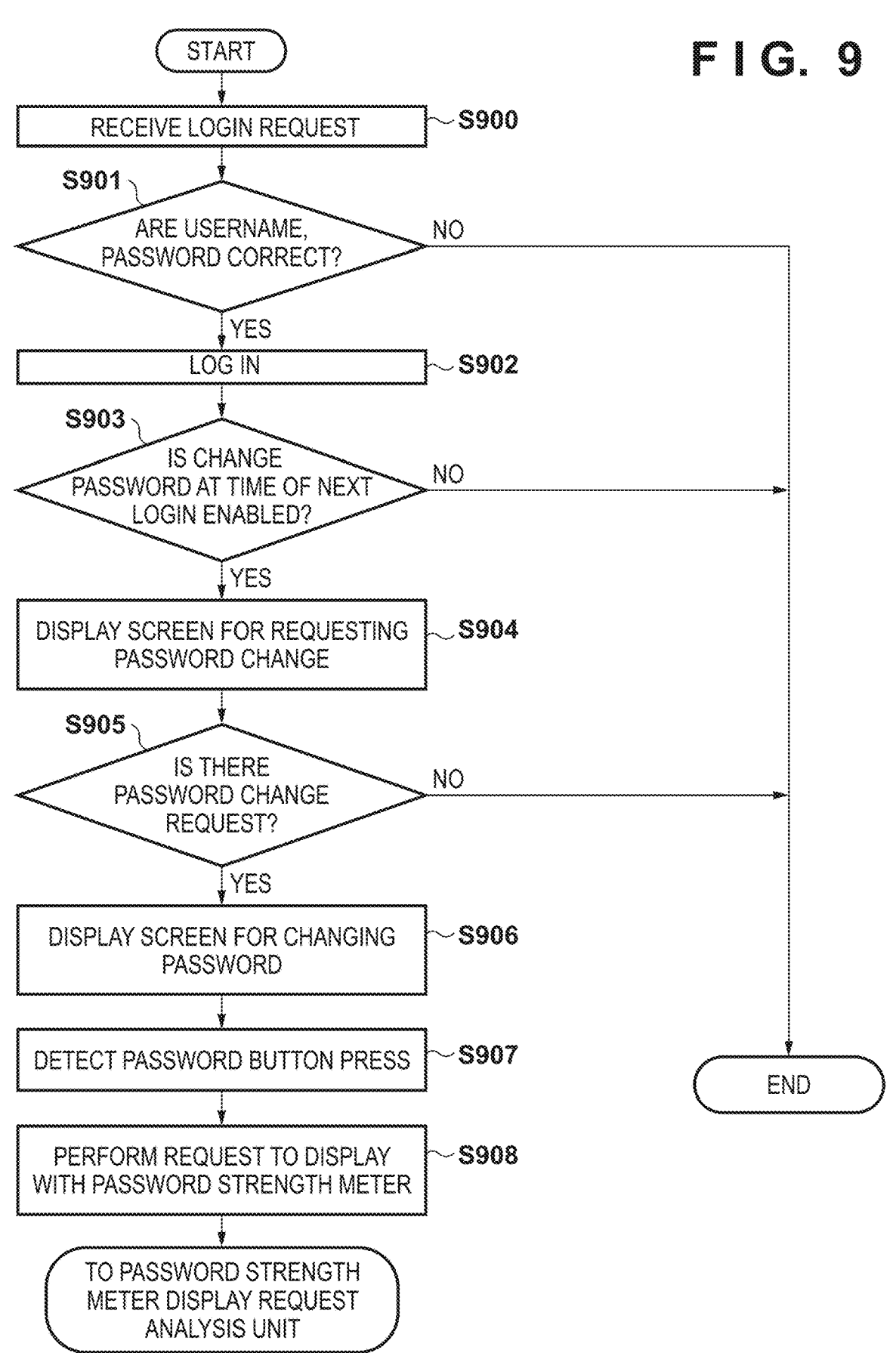
FIG. 9 is a flowchart illustrating an operation flow at the time of resetting a password.

FIG. 9 is a flowchart illustrating an operation flow when a login attempt is made by a user who has been newly registered or whose user information has been edited in a state in which the setting 511 to change the password at the time of the next login is enabled on the user registration screen 502 and the user editing screen 503.

When the setting 511 to change the password at the time of the next login on the user registration screen 502 and the user editing screen 503 is enabled, the user is requested to change the password at the time of the next login.

Upon detecting that a username and a password have been input on the keyboard authentication screen 403 (S900), the user authentication service 303 determines whether the username and the password are correct (S901).

If the username and the password are not correct, the process ends. If they are correct, the user authentication service 303 executes a login process (S902). Subsequently, the user authentication service 303 determines whether the setting 511 to change the password at the time of the next login is enabled (S903). If it is determined that the setting is not enabled, the process ends.

If it is determined that the setting is enabled, the user authentication service 303 displays the screen 504 for requesting to change the password (S904). The user authentication service 303 determines whether an OK button has been pressed, or a cancel button has been pressed on the screen 504 for requesting to change the password (S905). If it is determined that the cancel button has been pressed, the user authentication service 303 ends the process. In the present embodiment, a login is also allowed after cancellation. However, a login may not be allowed unless the password is changed. In that case, only a password change may be provided as a selectable option on the screen 504 for requesting a password change, without displaying the cancel button. In this case, in S905 in FIG. 9, the user authentication service 303 may wait until the OK button is touched, and proceed to S906 if the OK button is touched.

If it is determined that the OK button is pressed on the screen 504 for requesting a password change, the user authentication service 303 displays the screen 505 for changing the password (S906).

When the password button on the screen 505 for changing the password is pressed, the user authentication service 303 detects the pressing of the password button (S907). Then, the user authentication service 303 transmits a request to display the software keyboard with a password strength meter to the password strength display request analysis unit 307 (S908).

The processes S1001 to S1004 executed by the password strength display request analysis unit 307 are the same as those described above, and therefore the description thereof has been omitted.

The above-described procedure allows a user to reset the password at the time of logging in, when the setting 511 to change the password at the time of the next login is enabled. Note that in the procedure shown in FIG. 9, when the password has been reset at the time of logging in, the user of that password is logged in, but the user may not log in that case. In such a case, the user needs to log in with a new password resulting from the resetting.

Software Keyboard with Password Strength Meter

The software keyboard with a password strength meter has been described to be a screen provided, for example, by adding a password strength meter to the password input screen 601. FIGS. 11A to 11C are diagrams showing examples of such a software keyboard with a password strength meter. A software keyboard 1101 with a password strength meter, shown in FIG. 11A, displays, in a free space (free region) of the software keyboard, a meter unit 1102 that indicates a password strength, and a level display unit 1103 that indicates a password strength level with characters. At their respective positions, neither of the meter unit 1102 that indicates a password strength and the strength level display unit 1103 that indicates a password strength overlaps any keys of the keyboard.

In the example of the software keyboard 1101, the strength level is determined to be 1. The display of the meter unit 1102 is indicated by the strength level 1, and the characters "Weak" are displayed on 1103 as the characters representing the strength level 1. As examples of display of strength, display using a meter and display using characters representing the strength level are performed in the present embodiment. However, one of the two forms of display may be performed, or the strength level may be displayed as it is, for example.

As the method for displaying the password strength meter, methods other than a method using the software keyboard 1101 are also possible. For example, a software keyboard 1111 with a password strength meter, shown in FIG. 11B, displays, at the center of the screen, a strength meter unit 1112 including a meter that indicates a password strength and characters representing a password strength level. The strength meter unit 1112 is displayed at a predetermined position, but the display location need not be at the center of the screen. This display is performed each time a password is input, and the screen is displayed such that the display disappears after a fixed time period. This is intended for a situation where there is no space for display on the software keyboard: Although the strength meter unit 1112 is displayed overlapping the keyboard, the usability is prevented from being reduced since the display disappears after a fixed time period.

In a software keyboard 1121 with a password strength meter, shown in FIG. 11C, the display location of a strength meter unit 1114 including a meter that indicates a password strength and characters representing a password strength level may be changed according to the position of a button 1113 that has been pressed.

The password strength meter may have other configurations. For example, a number indicating the evaluated password strength may be directly displayed at a specific location on the password input screen. Alternatively, a watermark image of such a number may be synthesized and displayed on the password input screen. For example, in the case of 5-grade evaluation, any of the numbers 1 to 5 is displayed.

In this manner, the password strength meter is displayed such that the password strength meter is superimposed on the software keyboard, and that their respective displays, in particular, the input character strings, do not interfere with each other. The password strength meter may be further configured to not to interfere with the display of the keyboard. This enables a user to visually confirm a password and the strength of the password together even in the case of inputting the password using a software keyboard displayed in a small display unit.

Calculation of Password Strength

FIG. 12 is a flowchart illustrating an operation of the user authentication service 303 calculating the strength of a password input on the software keyboard 1101 with a strength meter. Note that the process illustrated in FIG. 12 may be executed when the password strength meter is displayed, and need not be executed at the time of inputting a password on the software keyboard 601 without a strength meter. In that case, the user authentication service 303 may simply receive the input characters.

Upon detecting input of characters on the software keyboard 1101 with a strength meter, the local UI 301 transmits, to the user authentication service 303, a password character string that is being input. Upon receiving the password character string (S1201), the user authentication service 303 calculates the password strength according to a predetermined mathematical expression, using the password strength calculation unit 306 (S1202). The user authentication service 303 determines whether the setting 423 to prohibit input of a low-strength password is ON and whether the calculated strength has a value less than or equal to the prohibited strength level setting 424 (S1203).

If it is determined that input of a low-strength password is prohibited, and that the calculated strength is less than or equal to the prohibited strength level setting, the user authentication service 303 notifies the local UI 301 that the strength level is a prohibited level (S1204). Upon receiving the notification, the local UI 301 disables pressing of the next button 1104 on the software keyboard 1101 with a strength meter. If the strength level is not less than or equal to the prohibited strength level setting in S1203, the user authentication service 303 notifies the local UI 301 that the strength level is not a prohibited level (S1205). Upon receiving the notification, the local UI 301 enables pressing of the next button 1104 on the software keyboard 1101 with a strength meter.

Effects of Embodiment 1

As described above, the MFP 101 described in the present embodiment can provide a method for displaying a password strength meter using a software keyboard on a device having a limited display region, while a password is being input, and provide a convenient information processing apparatus.

In the above-described embodiment, whether the password strength meter is to be displayed or not to be displayed is switched by referring to the password strength meter setting 421. However, the password strength meter may be constantly displayed at the time of inputting a password. However, in that case as well, the password strength meter may be displayed at the time of inputting a password for registration or changing, and the password strength meter may not be displayed at the time of inputting a password for confirmation and authentication.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-126437, filed Aug. 2, 2023 which is hereby incorporated by reference herein in its entirety.

What is claimed is:

1. An information processing apparatus comprising:
a user interface for display to a user and input by the user;
at least one memory storing at least one program; and
at least one processor, the at least one program being configured to cause the at least one processor to:
display a software keyboard for inputting a password, using the user interface;
in a case where a password strength meter indicating a strength of a password is set to be displayed using the user interface,
calculate a strength of a password input from the software keyboard;
display the software keyboard and the password strength meter indicating the strength of the input password; and
change a position of display of the password strength meter according to a character input using the software keyboard, and
in a case where a password strength meter indicating a strength of a password is set not to be displayed using the user interface, display the software keyboard,
wherein, in the case where a password strength meter indicating a strength of a password is set not to be displayed using the user interface, the password strength meter is not displayed.

2. The information processing apparatus according to claim 1,
wherein the at least one program causes the at least one processor to
save a first setting provided by a user to indicate whether the password strength meter is to be displayed or not to be displayed, and
the case where a password strength meter indicating a strength of a password is set to be displayed using the user interface is a case where the password strength meter is set to be displayed in the first setting.

3. The information processing apparatus according to claim 2,

wherein the case where a password strength meter indicating a strength of a password is set to be displayed using the user interface is a case where the password strength meter is set to be displayed in the first setting, and where the password has been input for setting a password.

4. The information processing apparatus according to claim 2,
wherein the at least one program causes the at least one processor to
further save a second setting indicating not to accept a setting of a password having a strength less than or equal to a reference value, and,
in a case where the password strength meter is set to be displayed in the first setting, and where a setting indicating not to accept a password having a strength less than or equal to a reference value is set in the second setting, a password having a strength less than or equal to the reference value is not accepted.

5. The information processing apparatus according to claim 2,
wherein the at least one program causes the at least one processor to
display a user interface screen for receiving the first setting using the user interface.

6. The information processing apparatus according to claim 4,
wherein the at least one program causes the at least one processor to
display a user interface screen for receiving the second setting using the user interface.

7. The information processing apparatus according to claim 1,
wherein the at least one program causes the at least one processor to
display, in the software keyboard for inputting a password, the password that is input, and display the password strength meter in a free region of the software keyboard, the free region not overlapping the password.

8. The information processing apparatus according to claim 1,
wherein the at least one program causes the at least one processor to
cause the password strength meter to disappear after being displayed for a fixed time period.

9. The information processing apparatus according to claim 1, further comprising an image forming unit.

10. A non-transitory computer-readable storage medium storing thereon a program which, when loaded into a computer and executed, causes the computer to execute a process, the computer having a user interface and the process comprising:
displaying a software keyboard for inputting a password, using the user interface;
in a case where a password strength meter indicating a strength of a password is set to be displayed using the user interface,
calculating a strength of a password input from the software keyboard;
displaying the software keyboard and the password strength meter indicating the strength of the input password; and
changing a position of display of the password strength meter according to a character input using the software keyboard; and in a case where a password strength meter indicating a strength of a password is set not to be displayed using the user interface, displaying the software keyboard, wherein, in the case where a password strength meter indicating a strength of a password is set not to be displayed using the user interface, the password strength meter is not displayed.

11. A method of displaying a password strength using an information processing apparatus including a user interface for display to a user and input by the user, the method comprising:

displaying a software keyboard for inputting a password, using the user interface;

in a case where a password strength meter indicating a strength of a password is set to be displayed using the user interface, calculating a strength of a password input from the software keyboard;

displaying the software keyboard and the password strength meter indicating the strength of the input password; and changing a position of display of the password strength meter according to a character input using the software keyboard; and in a case where a password strength meter indicating a strength of a password is set not to be displayed using the user interface, displaying the software keyboard, wherein, in the case where a password strength meter indicating a strength of a password is set not to be displayed using the user interface, the password strength meter is not displayed.

\* \* \* \* \*